(12) United States Patent
Beall et al.

(10) Patent No.: US 7,485,170 B2
(45) Date of Patent: Feb. 3, 2009

(54) NARROW PORE SIZE DISTRIBUTION CORDIERITE CERAMIC HONEYCOMB ARTICLES AND METHODS FOR MANUFACTURING SAME

(75) Inventors: Douglas Munroe Beall, Painted Post, NY (US); Thomas Richard Chapman, Painted Post, NY (US); Weiguo Miao, Big Flats, NY (US); Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 540 days.

(21) Appl. No.: 11/291,831

(22) Filed: Nov. 30, 2005

(65) Prior Publication Data
US 2007/0119134 A1 May 31, 2007

(51) Int. Cl.
*B01D 46/00* (2006.01)
*F01N 3/022* (2006.01)

(52) U.S. Cl. ............... 55/523; 55/282.2; 55/282.3; 55/385.3; 55/524; 55/DIG. 5; 55/DIG. 10; 55/DIG. 30; 60/299; 60/311; 422/180; 264/628; 264/630; 264/631; 264/DIG. 48; 428/116

(58) Field of Classification Search ............... 55/282.2, 55/282.3, 385.3, 523, 524, DIG. 5, DIG. 10, 55/DIG. 30; 60/295, 297, 300, 303, 311, 60/299; 422/177, 180; 264/628, 630, 631, 264/DIG. 48; 502/439; 501/9, 119; 428/116, 428/117, 118
See application file for complete search history.

(56) References Cited

U.S. PATENT DOCUMENTS

| | | | |
|---|---|---|---|
| 3,885,977 A | 5/1975 | Lachman et al. | 106/62 |
| 4,279,849 A | 7/1981 | Ogawa et al. | 264/63 |
| 4,329,162 A | 5/1982 | Pitcher, Jr. | 55/523 |
| 4,632,683 A * | 12/1986 | Fukutani et al. | 55/523 |
| 5,069,697 A | 12/1991 | Hamaguchi et al. | 55/523 |
| 5,185,110 A | 2/1993 | Hamaguchi et al. | 264/44 |
| 5,258,150 A | 11/1993 | Merkel et al. | 264/43 |
| 6,087,281 A * | 7/2000 | Merkel | 501/9 |
| 6,210,626 B1 * | 4/2001 | Cornelius et al. | 264/631 |
| 6,284,693 B1 * | 9/2001 | Beall et al. | 501/119 |
| 6,541,407 B2 | 4/2003 | Beall et al. | 501/119 |
| 6,773,481 B2 * | 8/2004 | Noguchi et al. | 55/523 |
| 6,800,108 B2 | 10/2004 | Noda | 55/523 |
| 6,814,774 B2 | 11/2004 | Ishihara et al. | 55/523 |
| 6,864,198 B2 | 3/2005 | Merkel | 501/80 |
| RE38,888 E | 11/2005 | Beall et al. | 501/119 |
| 2002/0004445 A1* | 1/2002 | Beall et al. | 501/119 |
| 2004/0029707 A1* | 2/2004 | Beall et al. | 264/631 |
| 2004/0148916 A1* | 8/2004 | Merkel | 55/523 |
| 2004/0261384 A1* | 12/2004 | Merkel et al. | 55/523 |

FOREIGN PATENT DOCUMENTS

WO 2006/030811 3/2006

\* cited by examiner

Primary Examiner—Jason M Greene
(74) Attorney, Agent, or Firm—Matthew B. McNutt (57) ABSTRACT

Disclosed are ceramic honeycomb articles, which are composed predominately of a crystalline phase cordierite composition. The ceramic honeycomb articles possess a microstructure characterized by a unique combination of relatively high porosity between 42% and 56%, and relatively narrow pore size distribution wherein less than 15% of the total porosity has a pore diameter less than 10 μm, less than 20% of the total porosity has a pore diameter greater than 30 μm, and $d_{breadth} \leq 1.50$ wherein $d_{breadth}=(d_{90}-d_{10})/d_{50}$. The articles exhibits high thermal durability and high filtration efficiency coupled with low pressure drop across the filter. Such ceramic articles are particularly well suited for filtration applications, such as diesel exhaust filters or DPFs. Also disclosed is a method for manufacturing the ceramic article wherein the pore former is preferably potato starch having a median particle diameter greater than 40 μm.

35 Claims, 4 Drawing Sheets

NARROW PORE SIZE DISTRIBUTION CORDIERITE CERAMIC HONEYCOMB ARTICLES AND METHODS FOR MANUFACTURING SAME

BACKGROUND OF THE INVENTION

1. Field of the Invention

The present invention relates to ceramic articles, and more particularly to porous cordierite-containing ceramic honeycomb articles having properties suitable for use in exhaust after-treatment applications, particularly diesel exhaust filtration, and methods for manufacturing such articles.

2. Technical Background

Recently, much interest has been directed towards the diesel engine due to its fuel efficiency, durability and economical aspects. However, diesel emissions have been scrutinized both in the United States and Europe, for their possibly harmful effects. As such, stricter environmental regulations will likely require diesel engines to be held to similar standards as gasoline engines. Therefore, diesel engine manufacturers and emission-control companies are working to achieve a diesel engine which is faster, cleaner and meets stringent emissions requirements under all operating conditions with minimal cost to the consumer.

One of the biggest challenges in lowering diesel emissions is controlling the levels of diesel particulate material present in the diesel exhaust stream. Diesel particulate material consists mainly of carbon soot. One way of removing the carbon soot from the diesel exhaust is through the use of diesel traps (otherwise referred to as wall-flow filters" or "diesel particulate filters"). Diesel particulate filters capture the soot in the diesel exhaust on or in the porous walls of the filter body. The diesel particulate filter is designed to provide for nearly complete filtration of soot without significantly hindering the exhaust flow. However, as the layer of soot collects in the inlet channels of the diesel particulate filter, the lower permeability of the soot layer causes a gradual rise in the back pressure of the filter against the engine, causing the engine to work harder. Thus, once the carbon soot in the filter has accumulated to some level, the filter must be regenerated by burning out the soot, thereby restoring the back pressure again to low levels. Normally, this regeneration is accomplished under controlled conditions of engine management whereby a slow burn is initiated which lasts for a number of minutes, during which the temperature in the filter rises from a lower operational temperature to a maximum temperature.

Cordierite, being a low-cost material, in combination with offering a relatively low coefficient of thermal expansion (CTE), has been the material of choice in diesel exhaust filtration. To that end, porous cordierite ceramic filters of the wall-flow type have been utilized for the removal of particles in the exhaust stream from some diesel engines since the early 1980s. A diesel particulate filter (DPF) ideally should combine low CTE (for thermal shock resistance), low pressure drop (for fuel efficiency), high filtration efficiency (for high removal of particles from the exhaust stream), high strength (to survive handling, canning, and vibration in use), and low cost. However, achieving this combination of features has proven elusive with cordierite DPFs.

Thus, DPF design requires the balancing of several properties, including porosity, pore size distribution, thermal expansion, strength, elastic modulus, pressure drop, and manufacturability. Further, several engineering tradeoffs have been required in order to fabricate a filter having an acceptable combination of physical properties and processability. For example, increased porosity is often attainable through the use of coarser raw materials, the use of pore forming agents, and or lower sintering temperatures. However, each of these may result in an increase in thermal expansion which may compromise the survivability of the filter in use.

Thus, it would be considered a significant advancement in the art to obtain optimized ceramic honeycomb articles, made of cordierite which are suitable for use in filter applications and which exhibit high thermal durability and high filtration efficiency coupled with low pressure drop across the filter. In particular, there is a recognized need in the art for cordierite ceramic honeycomb articles which possess desirable combinations of porosity, relatively narrow pore size distribution, and relatively low coefficient of thermal expansion (CTE). To that end, as described below, the present invention provides such cordierite honeycomb articles and methods of manufacturing therefor.

SUMMARY OF THE INVENTION

The present invention relates to ceramic honeycomb articles, and more particularly to cordierite-containing ceramic honeycomb articles having properties suitable for use in exhaust after-treatment applications; particularly in diesel exhaust filtration.

In a first aspect of the present invention, a porous ceramic honeycomb article is provided containing cordierite and having a total porosity (% P), measured by mercury porosimetry, wherein 42%<% P<56%; whereas in more preferred embodiments 44%<% P<54%, or even 44%<% P<52%. The ceramic honeycomb article further comprises a narrow pore size distribution characterized by less than 15% of the total porosity having a pore diameter less than 10 μm, less than 20% of the total porosity having a pore diameter greater than 30 μm and exhibiting a $d_{breadth} \leq 1.50$, wherein $d_{breadth}=(d_{90}-d_{10})/d_{50}$. Additionally, the porous ceramic article preferably exhibits a mean pore diameter ($d_{50}$) wherein 13 μm $\leq d_{50} \leq$ 22 μm.

Further, according to additional embodiments of the invention, less than 10% of the total porosity has a pore diameter less than 10 μm, and furthermore less than 25% of the total porosity has a pore diameter greater than 25 μm. Additionally, the ceramic honeycomb article may further comprise greater than 60% of the total porosity having a pore diameter greater than or equal to 10 μm and less than or equal to 30 μm; or greater than 70%; or even greater than 80%.

Additionally, according to further aspects of the invention, the ceramic honeycomb article may exhibit a low coefficient of thermal expansion (CTE) wherein CTE$\leq 8.0 \times 10^{-7}$/°C. across the temperature range of from 25° C. to 800° C.; or CTE$\leq 6.0 \times 10^{-7}$/°C. (25° C. to 800° C.), or even CTE$\leq 5.0 \times 10^{-7}$/°C. (25° C. to 800° C.). In some exemplary embodiments CTE$\leq 4.0 \times 10^{-7}$/°C. (25° C. to 800° C.), or even CTE$\leq 3.0 \times 10^{-7}$/°C. (25° C. to 800° C.).

Further, the ceramic honeycomb article may exhibit a narrow pore size distribution of the small portion of the distribution as characterized by a $d_{factor} \leq 0.45$, wherein $d_{factor}=(d_{50}-d_{10})/d_{50}$; or even a $d_{factor} \leq 0.40$. Yet further exemplary embodiments are characterized by a $d_{factor} \leq 0.35$; or even a $d_{factor} \leq 0.33$. Similarly, the narrowness of the overall pore size distribution of the article, taking into account both the large pores and small pores in the pore size distribution, is further characterized by exhibiting a $d_{breadth} \leq 1.35$, or even $d_{breadth} \leq 1.20$.

Certain preferred embodiments exhibit combinations of properties exceedingly useful for diesel particle filtration, such as 44%<% P<52%, 14 μm $\leq d_{50} \leq$ 21 μm, CTE$\leq 6.0 \times 10^{-7}$/°C. (25° C. to 800° C.), and $d_{factor} \leq 0.45$. Other embodiments of the inventive ceramic honeycomb article exhibit 42%<% P<56%, 13 µm≦$d_{50}$≦22 µm, CTE≦6.0×$10^{-7}$/° C. (25° C. to 800° C.), and $d_{breadth}$≦1.50. Such combinations exhibit excellent strength and thermal shock resistance, as well as low pressure drop and good filtration efficiency.

The inventive ceramic honeycomb articles of the invention are suitable for use in high temperature applications, and are particularly suitable for use as diesel exhaust filtration devices because they exhibit low pressure drops, high filtration efficiency and good strength. To this end, in another aspect, there is provided a ceramic honeycomb article exhibiting the structure of a filter and having an inlet end and an outlet end, a multiplicity of cells extending from the inlet end to the outlet end, the cells having porous walls, wherein part of the total number of cells at the inlet end are plugged along a portion of their lengths, and the remaining part of the cells that are open at the inlet end are preferably plugged at the outlet end along a portion of their lengths, so that an engine exhaust stream passing through the cells of the honeycomb from the inlet end to the outlet end flows into the open cells, then through the cells walls, and out of the article through the open cells at the outlet end.

In another broad aspect of the present invention, a method for manufacturing a porous ceramic honeycomb article, as described above, is provided. The method comprises the steps of providing a plasticized cordierite precursor batch composition containing inorganic batch components; a pore former comprising having a median particle diameter greater than 40 µm (preferably a potato starch); a liquid vehicle; and a binder. A honeycomb green body is then formed from the plasticized ceramic precursor batch composition and subsequently fired under conditions effective to convert the green body into a ceramic honeycomb article containing cordierite. In one aspect, the resulting fired ceramic honeycomb article has a total porosity greater than 42% and less than 56%, more preferably between 44 and 52%. In a further aspect, the honeycomb article exhibits a narrow pore size distribution wherein less than 15% of the total porosity has a pore diameter less than 10 µm, and wherein less than 20% of the total porosity has a pore diameter greater than 30 µm.

In still another broad aspect of the present invention, a ceramic honeycomb article is provided comprising a porous ceramic containing cordierite having a total porosity (% P) wherein 42%<% P<56%, and a pore size distribution having $d_{breadth}$≦1.50 and $d_{factor}$≦0.45 wherein $d_{factor}$=($d_{50}$-$d_{10}$)/$d_{50}$ and wherein $d_{breadth}$=($d_{90}$-$d_{10}$)/$d_{50}$.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain aspects of the instant invention and together with the description, serve to explain, without limitation, the principles of the invention.

DETAILED DESCRIPTION OF THE INVENTION

The present invention can be understood more readily by reference to the following detailed description, examples, and claims, and their previous and following description. However, before the present articles and/or methods are disclosed and described, it is to be understood that this invention is not limited to the specific articles and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to an "alumina forming source" includes aspects having two or more such alumina forming sources, unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, a "wt. %" or "weight percent" or "percent by weight" of an organic component, unless specifically stated to the contrary, is based on the total weight of the total inorganics in which the component is included. Organics are specified herein as superadditions based upon 100% of the inorganics used.

As briefly introduced above, the present invention seeks to provide an improved ceramic honeycomb article useful for ceramic filter applications and exhibits high thermal durability and high filtration efficiency coupled with low pressure drop across the filter. To this end, a pore microstructure is provided in a fired ceramic body that is characterized by a relatively high level of porosity, a relatively narrow pore size distribution, and a relatively low coefficient of thermal expansion (CTE). It has been found that such a microstructure enables wash coat loadings to be applied to the filter with a minimal resulting increase in undesired backpressure. Moreover, such structure provides improved thermal shock durability.

In accordance therewith, the present invention provides a ceramic honeycomb article, which in one aspect is composed predominately of a crystalline phase cordierite composition. The ceramic honeycomb article possess a microstructure characterized by a unique combination of relatively high porosity (but not too high) and relatively narrow pore size distribution, both as measured by mercury porosimetry. The ceramic structure is useful for ceramic filter applications requiring high thermal durability and high filtration efficiency coupled with low pressure drop across the filter. Such ceramic articles are particularly well suited for filtration applications, such as diesel exhaust filters or DPFs.

The cordierite ceramic honeycomb article of the present invention comprises a relatively narrow pore size distribution characterized by a minimized percentage of relatively fine pores as well as and relatively minimized percentage of large pore sizes. For example, in one aspect, the pore size distribution of the pores is characterized by a percentage of pores having a pore diameter less than 10 µm being less than 15%. In another aspect, the percentage of pores having a pore diameter less than 10 µm may be less than 10%, or even less than 8% of the total porosity of the ceramic structure. Having low percentage of small pore is desirable to minimize the propensity of such pores to be come blocked by wash coating thereby increasing the wash-coated pressure drop across the filter article.

Additionally, the inventive ceramic honeycomb articles according to the invention further comprise a relatively low percentage of pores having a diameter greater than 30 µm. For example, in one aspect, the percentage of pores of the distribution having a pore diameter greater than 30 µm may be less than 20%, less than 15%, or even less than 12%. In still another aspect, the percentage of pores having a pore diameter greater than 30 µm can be less than 10%, or even less than 8% of the total porosity of the ceramic structure.

The parameters $d_{10}$, $d_{50}$ and $d_{90}$ relate to the pore size distribution and will be used herein, among other parameters, to define the relative narrowness of the pore size distribution. The quantity $d_{50}$ is the median pore diameter based upon pore volume, and is measured in µm; thus, $d_{50}$ is the pore diameter at which 50% of the open porosity of the ceramic honeycomb article has been intruded by mercury. The quantity $d_{90}$ is the pore diameter at which 90% of the pore volume is comprised of pores whose diameters are smaller than the value of $d_{90}$; thus, $d_{90}$ is equal to the pore diameter at which 10% by volume of the open porosity of the ceramic has been intruded by mercury. The quantity $d_{10}$ is the pore diameter at which 10% of the pore volume is comprised of pores whose diameters are smaller than the value of $d_{10}$; thus, $d_{10}$ is equal to the pore diameter at which 90% by volume of the open porosity of the ceramic has been intruded by mercury. The values of $d_{10}$ and $d_{90}$ are also in units of microns.

According to another aspect illustrating the narrowness of the pore size distribution of the article, $d_{10}$ is greater than or equal to 8.0 µm. In still another aspect, $d_{10}$ may be greater than or equal to 10.0 µm, or even greater than or equal to 11.0 µm. Additionally, $d_{90}$ is preferably less than or equal to 38.0 µm. In still another aspect, $d_{90}$ may be less than or equal to 32.0 µm, or even less than or equal to 30.0 µm. Most preferably, $d_{10}$ is greater than or equal to 8.0 µm and $d_{90}$ is less than or equal to 38.0 µm.

In an additional aspect, the narrow pore size distribution of the inventive ceramic honeycomb articles are evidenced by the width of the distribution of pore sizes finer than the median pore size, $d_{50}$. As used herein, the width of the distribution of pore sizes finer than the median pore size, $d_{50}$, are represented by a so-called "$d_{factor}$" value which expresses the quantity $(d_{50}-d_{10})/d_{50}$. To this end, the ceramic structure of the present invention, in one aspect, comprises a $d_{factor}$ less than or equal to 0.45, less than or equal to 0.40, less than or equal to 0.38, or even less than or equal to 0.35. In certain exemplary embodiments, a $d_{factor}$ of less than or equal to 0.33 was achieved.

The narrow pore size distribution of the inventive ceramic articles is also evidenced by the width of the distribution of pore sizes that are finer and coarser than the median pore size, $d_{50}$. As used herein, the width of the distribution of pore sizes that are finer and coarser than the median pore size, $d_{50}$, are represented by a "$d_{breadth}$" value which expresses the quantity $(d_{90}-d_{10})/d_{50}$. To this end, the ceramic structure of the present invention in one aspect comprises a pore size distribution with a $d_{breadth} \leq 1.50$. In certain exemplary embodiments, $d_{breadth} \leq 1.35$ or even $d_{breadth} \leq 1.20$. Extremely narrow pore size distribution embodiments in accordance with aspects of the invention exhibit $d_{breadth} \leq 1.10$.

The total porosity of the inventive ceramic body, as measured by mercury porosimetry, is at least 42%. To that end, in another aspect, the total porosity of the ceramic article is from greater than 42% to less than 56%. In still another aspect of the invention, the porosity can be less than 54%; less than 52%; or even less than 50%. In still another aspect of the invention, the porosity can be in the range of greater than 44% to less than 52%; or even 46% to less than 52%. Achieving relatively lower porosity while still achieving sufficiently low back pressure across the article is desired in that it provides higher strength.

The median pore diameter, $d_{50}$, of the pores present in the instant ceramic articles is, in one aspect, at least 13 µm. In another aspect, the median pore diameter, $d_{50}$, is in the range of from 13 µm to 22 µm. In another aspect, the median pore diameter, $d_{50}$, can be in the range of from 14 µm to 21 µm; or even 15 µm to 20 µm. These ranges provide suitable filtration efficiencies.

Another advantage of the inventive articles is a low thermal expansion resulting in excellent thermal shock resistance (TSR). TSR is inversely proportional to the coefficient of thermal expansion (CTE). That is, honeycomb ceramic articles with low thermal expansion have good thermal shock resistance and can survive the wide temperature fluctuations that are encountered in end use filter applications. Accordingly, in one aspect, the ceramic articles of the present invention are characterized by having a low coefficient of thermal expansion (CTE), measured by dilatometry, in the axial direction wherein $CTE \leq 8.0 \times 10^{-7}$/° C. across the temperature range of from 25° C. to 800° C. In another aspect, $CTE \leq 6.0 \times 10^{-7}$/° C.; $CTE \leq 5.0 \times 10^{-7}$/° C., or even $CTE \leq 4.0 \times 10^{-7}$/° C. across the temperature range of from 25° C. to 800° C. In several outstanding exemplary embodiments of the invention, $CTE \leq 3.0 \times 10^{-7}$/° C. across the temperature range of from 25° C. to 800° C.

As one of skill in the art will appreciate, the elastic modulus of a material represents the relative stiffness of the material within the elastic range and can be determined from a stress-strain curve by calculating the ratio of stress to strain. In another aspect, the inventive ceramic articles further preferably exhibit an elastic modulus (eMod) less than 1.00 (psi×$10^6$), or even less than 0.80 (psi×$10^6$) for a 300/15 cell geometry.

The ceramic articles of the present invention can have any shape or geometry suitable for a particular application. In high temperature filtration applications, such as diesel particulate filtration, for which the inventive articles are especially suited, it is preferred the articles to have a multicellular structure, such as that of a honeycomb monolith shown in FIG. 4.

Figure 1:
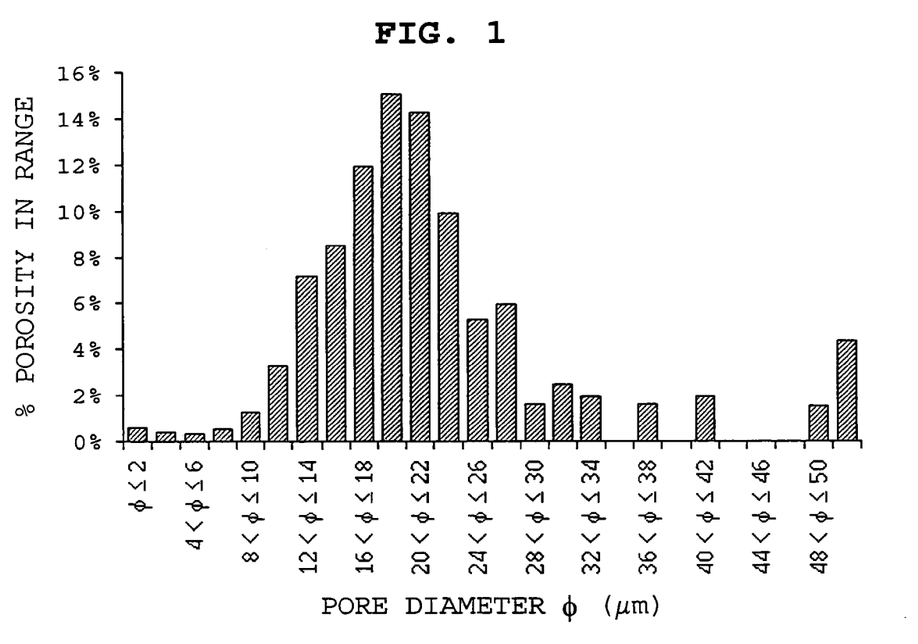
FIG. 1 is a bar graph of an exemplary embodiment of the invention illustrating the narrowness of the pore size distribution according to one aspect of the present invention.
Figure 2:
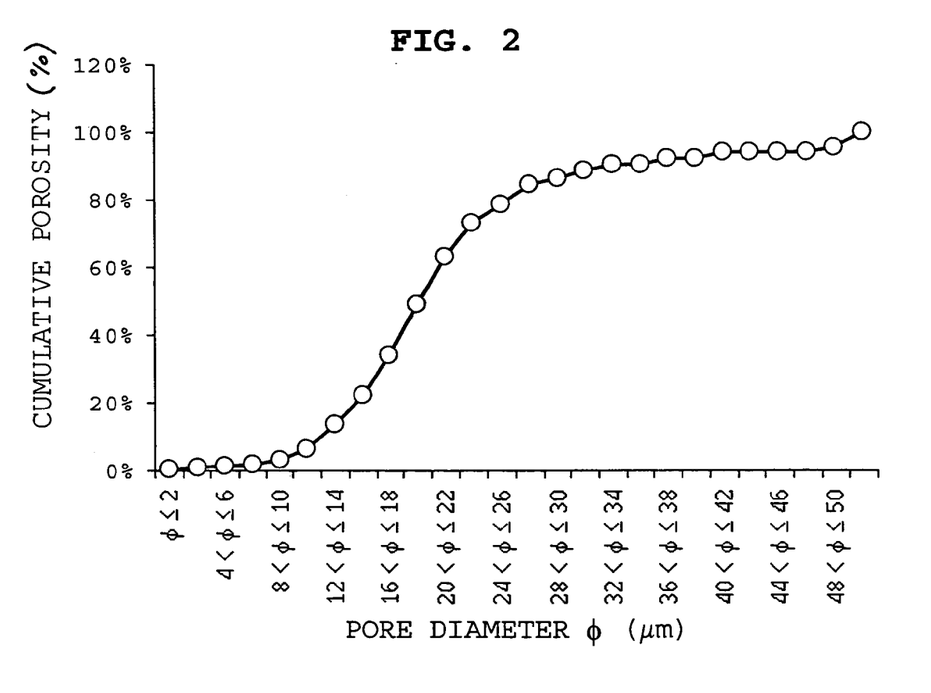
FIG. 2 is a graph illustrating pore diameter vs. cumulative porosity % for the exemplary ceramic honeycomb article according to the present invention.
Figure 3:
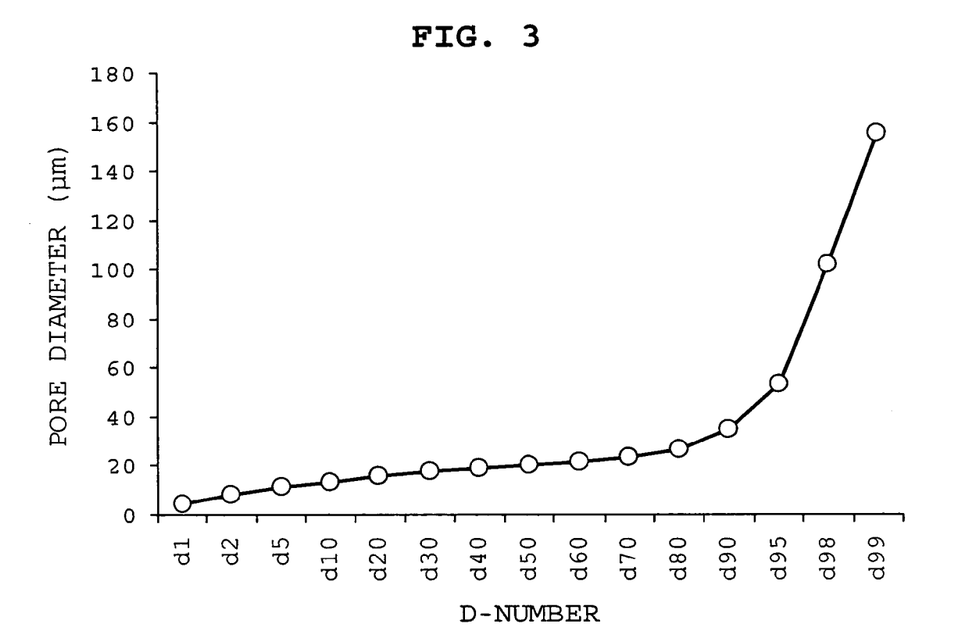
FIG. 3 is a graph illustrating the D-number vs. pore diameter (µm) for the exemplary ceramic honeycomb article according to the present invention.
Figure 4:
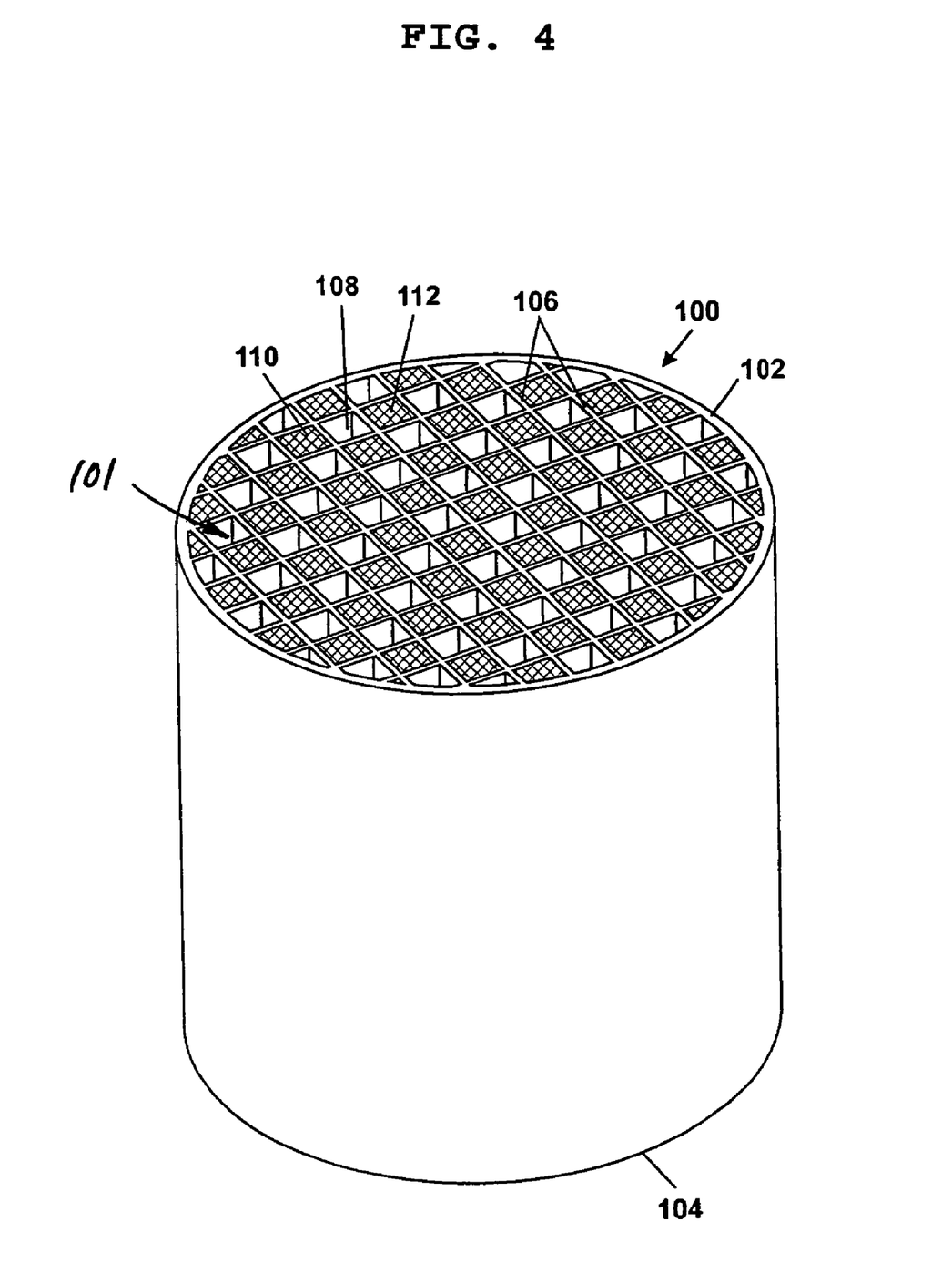
FIG. 4 is a perspective view of a ceramic honeycomb article according to the present invention.

The honeycomb article 100 preferably has an inlet 102 and outlet end 104, and a multiplicity of cells 108, 110 extending from the inlet end to the outlet end, the cells formed from intersecting porous walls 106. The inventive articles 100 may have a cellular density from about 70 cells/in$^2$ (10.9 cells/cm$^2$) to about 400 cells/in$^2$ (62 cells/cm$^2$). When the article is a filter, preferably a portion of the cells 110 at the inlet end 102 are plugged with a paste having same or similar composition to that of the body 101, as described in U.S. Pat. No. 4,329,162. The plugging is preferably performed only at the ends of the cells and form plugs 112 typically having a depth of about 5 to 20 mm, although this can vary. A portion of the cells on the outlet end 104 but not corresponding to those on the inlet end 102 may also be plugged in a similar pattern. Therefore, each cell is preferably plugged only at one end. The preferred arrangement is to have every other cell on a given face plugged as in a checkered pattern as shown in FIG. 4.

This plugging configuration allows for more intimate contact between the exhaust stream and the porous walls of the filter. The exhaust stream flows into the filter through the open cells at the inlet end 102, then through the porous cell walls 106, and out of the body 101 through the open cells at the outlet end 104. Filters 100 of the type herein described are known as "wall flow" filters since the flow paths resulting from alternate channel plugging require the exhaust being treated to flow through the porous ceramic cell walls prior to exiting the filter.

Cordierite diesel particulate filters having lower pressure drop, in combination with high filtration efficiency, as well as improved strength have been obtained relative to cordierite filters of the prior art. The pressure drop across the filter is a function of the accumulation of the carbonaceous soot on the walls of the diesel particulate filter. As the amount of soot accumulated increases, it creates a progressive increase in the resistance to flow of the exhaust gas through the walls of the filter and carbon soot layer. This resistance to flow is manifested as a pressure drop that can be measured across the length of the filter, and results in an increased back pressure against the engine.

The pressure drop increase at a given loading of soot (in grams/liter) depends upon the geometry of the filter, the permeability of the ceramic wall, and the permeability of the accumulated soot layer. Geometric factors that influence pressure drop include the length and diameter of the filter, the depth of the plugs at the ends of the filter, the number of cells per unit area, and the thickness of the walls. The permeability of the clean ceramic wall, prior to soot loading, is controlled by the porosity, pore size distribution (as characterized by the % of large and small pores, the $d_{factor}$, and $d_{breadth}$ for example), and pore connectivity. Furthermore, during the initial stages of soot loading, some of the soot enters into the pores on the surface of the ceramic wall. This reduces the permeability of the wall compared to the permeability of the clean wall prior to the deposition of any soot. This reduction in permeability increases the pressure drop through the filter. During these initial stages of soot loading, the extent to which the pressure drop is increased at a given soot loading depends upon the permeability of the soot that resides within the pores of the filter wall. The permeability of the soot within the pores of the ceramic wall, in turn, depends upon how densely the soot particles are packed within the pore. Soot particles that are packed more densely will result in a lower permeability of gas through the soot within the pores, and, thus, a lower permeability through the wall within which the soot resides. It has been found that the density of the packing of the soot in the wall and, thus, the permeability of the wall containing the soot, are also influenced by the porosity, pore size distribution and pore connectivity of the ceramic comprising the wall. Thus, the porosity, pore size distribution and pore connectivity influence the pressure drop of the clean and soot-loaded filter, which, in turn, affects the fuel economy and efficiency of the diesel engine.

In addition to lower pressure drop, other advantages of the present invention include high filtration efficiencies, and improved strength relative to higher porosity filtering articles. This is due to the unique combination of porosity and pore size distribution described above.

The invention also provides a method for fabricating the inventive cordierite articles described above. To this end, it has now been discovered that a ceramic article having the aforementioned microstructure can be achieved from a ceramic precursor batch composition which comprises a coarse starch as a pore former, particularly a potato starch. Accordingly, the method of the present invention generally comprises the steps of first providing a plasticized ceramic precursor batch composition comprising inorganic ceramic forming batch component(s), a coarse pore former (preferably a potato starch), a liquid vehicle, and a binder; forming a green body having a desired shape from the plasticized ceramic precursor batch composition; and firing the formed green body under conditions effective to convert the green body into a ceramic article containing cordierite.

The inorganic batch components can be any combination of inorganic components which can, upon firing, provide a primary sintered phase composition comprised of cordierite containing ceramic.

In one aspect, the inorganic batch components can be selected from a magnesium oxide source; an alumina-forming source; and a silica source. The batch components are further selected so as to yield a ceramic article comprising cordierite, mullite, spinel, or a mixture thereof upon firing. For example, and without limitation, in one aspect, the inorganic batch components can be selected to provide a ceramic article which comprises at least about 93% by weight cordierite, the cordierite consisting essentially of, as characterized in an oxide weight percent basis, from about 49 to about 53 percent by weight $SiO_2$, from about 33 to about 38 percent by weight $Al_2O_3$, and from about 12 to about 16 percent by weight MgO.

To this end, an exemplary inorganic cordierite precursor powder batch composition preferably comprises about 33 to about 41 weight percent aluminum oxide source, about 46 to about 53 weight percent of a silica source, and about 11 to about 17 weight percent of a magnesium oxide source. Exemplary non-limiting inorganic batch component mixtures suitable for forming cordierite are those disclosed in U.S. Pat. No. 3,885,977.

The inorganic ceramic batch components can be synthetically produced materials such as oxides, hydroxides, and the like. Alternatively, they can be naturally occurring minerals such as clays, talcs, or any combination thereof. Thus, it should be understood that the present invention is not limited to any particular types of powders or raw materials, as such can be selected depending on the properties desired in the final ceramic body.

In one aspect, an exemplary and non-limiting magnesium oxide source can comprise talc. In a further aspect, suitable talcs can comprise talc having a mean particle size of at least about 5 µm, at least about 8 µm, at least about 12 µm, or even at least about 15 µm. Particle size is measured by a particle size distribution (PSD) technique, preferably by a Sedigraph by Micrometrics. Talc have particle sizes of between 15 and 25 µm are preferred. In still a further aspect, the talc can be a platy talc. As used herein, a platy talc refers to talc that exhibits a platelet particle morphology, i.e., particles having two long dimensions and one short dimension, or, for example, a length and width of the platelet that is much larger than its thickness. In one aspect, the talc possess a morphology index greater than about 0.50, 0.60, 0.70, or 80. To this end, the morphology index, as disclosed in U.S. Pat. No. 5,141,686, is a measure of the degree of platiness of the talc. One typical procedure for measuring the morphology index is to place the sample in a holder so that the orientation of the platy talc is maximized within the plane of the sample holder. The x-ray diffraction (XRD) pattern can then be determined for the oriented talc. The morphology index semi-quantitatively relates the platy character of the talc to its XRD peak intensities using the following equation:

$$M = \frac{I_x}{I_x + 2I_y}$$

where $I_x$ is the intensity of the peak and $I_y$ is that of the reflection.

Exemplary alumina forming sources can include aluminum oxides or a compound containing aluminum which when heated to sufficiently high temperature yields essentially 100% aluminum oxide. Non-limiting examples of alumina forming sources include corundum or alpha-alumina, gamma-alumina, transitional aluminas, aluminum hydroxide such as gibbsite and bayerite, boehmite, diaspore, aluminum isopropoxide and the like. Commercially available alumina sources can include relatively coarse aluminas, having a particle size of between about 4-6 micrometers, and a surface area of about 0.5-1 m²/g, and relatively fine aluminas having a particle size of between about 0.5-2 micrometers, and a surface area of about 8-11 m²/g.

If desired, the alumina source can also comprise a dispersible alumina forming source. As used herein, a dispersible alumina forming source is an alumina forming source that is at least substantially dispersible in a solvent or liquid medium and that can be used to provide a colloidal suspension in a solvent or liquid medium. In one aspect, a dispersible alumina source can be a relatively high surface area alumina source having a specific surface area of at least 20 m²/g. Alternatively, a dispersible alumina source can have a specific surface area of at least 50 m²/µg. In an exemplary aspect, a suitable dispersible alumina source for use in the methods of the instant invention comprises alpha aluminum oxide hydroxide (AlOOH.x.H₂O) commonly referred to as boehmite, pseudo-boehmite, and as aluminum monohydrate. In another exemplary aspect, the dispersible alumina source can comprise the so-called transition or activated aluminas (i.e., aluminum oxyhydroxide and chi, eta, rho, iota, kappa, gamma, delta, and theta alumina) which can contain various amounts of chemically bound water or hydroxyl functionalities.

Suitable silica forming sources can in one aspect comprise clay or mixtures, such as for example, raw kaolin, calcined kaolin, and/or mixtures thereof. Exemplary and non-limiting clays include non-delaminated kaolinite raw clay, having a particle size of about 7-9 micrometers, and a surface area of about 5-7 m²/g, clays having a particle size of about 2-5 micrometers, and a surface area of about 10-14 m²/g, delaminated kaolinite having a particle size of about 1-3 micrometers, and a surface area of about 13-17 m²/g calcined clay, having a particle size of about 1-3 micrometers, and a surface area of about 6-8 m²/g.

In a further aspect, it should also be understood that the silica forming source can further comprise, if desired, a silica raw material including fused $SiO_2$; colloidal silica; crystalline silica, such as quartz or cristobalite, or a low-alumina substantially alkali-free zeolite. Further, in still another aspect, the silica forming source can comprise a compound that forms free silica when heated, such as for example, silicic acid or a silicon organo-metallic compound.

As set forth above, the plasticized ceramic precursor batch composition further comprises a coarse pore former. As will be appreciated by one of ordinary skill in the art, a pore former is a fugitive particulate material which evaporates or undergoes vaporization by combustion during drying or heating of the green body to obtain a desired, usually larger porosity and/or coarser median pore diameter than would otherwise be obtained. It has been discovered that the use of certain large particle size starch pore formers, preferably potato starches, enables the manufacture of ceramic articles possessing the unique combination of microstructure and physical properties described above. A suitable starch, preferably a potato starch, for use in the use in the instant method can, in one aspect, comprise a median particle size greater than 40 um. In another aspect, the starch, preferably a potato starch, can comprise a median particle size in the range of from 45 um to 55 um. Further, the starch can be present in any amount effective to provide a desired porosity. However, in one aspect, the potato starch is present in an amount in the range of about 5-30 wt. % relative to the total weight of the inorganic batch components, more preferably between about 5-20 wt. %.

The inorganic batch components and the pore former agent can be intimately blended with a liquid vehicle and forming aids which impart plastic formability and green strength to the raw materials when they are shaped into a body. Forming may be done by, for example, molding or extrusion. When forming is done by extrusion, most typically a cellulose ether binder such as methylcellulose, hydroxypropyl methylcellulose, methylcellulose derivatives, and/or any combinations thereof, serve as a binder, and sodium stearate or oleic acid serves as a lubricant. The relative amounts of forming aids can vary depending on factors such as the nature and amounts of raw materials used, etc. For example, the typical amounts of forming aids are about 2% to about 10% by weight of methyl cellulose, and preferably about 3% to about 6% by weight, and about 0.5% to about 2% by weight sodium stearate or oleic acid, and preferably about 1.0% by weight. The raw materials and the forming aids are typically mixed together in dry form and then mixed with water as the vehicle. The amount of water can vary from one batch of materials to another and therefore is determined by pre-testing the particular batch for extrudability.

The liquid vehicle component can vary depending on the type of material used in order to in part optimum handling properties and compatibility with the other components in the ceramic batch mixture. Typically, the liquid vehicle content is usually in the range of from 20% to 50% by weight of the plasticized composition. In one aspect, the liquid vehicle component can comprise water.

The resulting stiff, uniform, and extrudable plasticized ceramic precursor batch composition can then be shaped into a green body by any known conventional ceramic forming process, such as, e.g., extrusion, injection molding, slip casting, centrifugal casting, pressure casting, dry pressing, and the like. In an exemplary aspect, extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The instant method and the resulting ceramic articles are in one aspect especially suited for use as diesel particulate filters. Specifically, the inventive ceramic articles are especially suited as multi-cellular honeycomb articles having a high filter volumetric heat capacity, a low pressure drop between the entrance and exit faces of the filter, a low CTE, and high filtration efficiency. To this end, in one aspect the plasticized ceramic precursor batch composition can be formed or otherwise shaped into a honeycomb configuration. Although a honeycomb ceramic filter of the present invention normally has a structure in which a plurality of through holes opened to the end surface of the exhaust gas flow-in side and to the end surface of the exhaust gas flow-out side are alternately sealed at both the end surfaces, the shape of the honeycomb filter is not particularly restricted. For example, the filter may be a cylinder having end surfaces with a shape of a circle or an ellipse, a prism having the end surfaces with a shape of a polygon such as a triangle or a square, a shape in which the sides of these cylinder and prism are bent like an "doglegged shape," or the like. In addition, the shape of through holes is not particularly limited. For example, the sectional shape may be a polygon, such as a square, a hexagon, an octagon, a circle, an ellipse, a triangle, or other shapes or combinations. It should however be understood that the particular desired size and shape of the ceramic article can depend on the application, e.g., in automotive applications by engine size and space available for mounting, etc.

The formed green body having a desired size and shape as described above can then be dried to remove excess moisture therefrom. The drying step can be performed by hot air, microwave, steam, or dielectric drying, or combinations and may be followed by ambient air drying. Once dried, the green body can thereafter be fired under conditions effective to convert the green body into a ceramic article comprising a primary crystalline phase ceramic composition as described below.

The firing conditions effective to convert the green body into a ceramic honeycomb article can vary depending on the process conditions such as, for example, the specific composition, size of the green body, and nature of the equipment used. To that end, in one aspect, the optimal firing conditions specified herein may need to be adapted for very large cordierite structures, i.e., slowed down, for example. However, in one aspect, for plasticized mixtures that are primarily for forming cordierite, the firing conditions comprise heating the green body to a maximum soak temperature of between about 1350° C. to about 1450° C. In still another aspect, the green body can be fired at a soak temperature in the range of from about 1400° C. to about 1450° C. In still yet another aspect, the green body may be fired at a soak temperature in the range of from about 1415° C. to about 1435° C., including a preferred soak temperature of, for example, of between about 1420° C. and about 1430° C.

The firing times can also range from approximately 40 to 250 hours, during which a maximum soak temperature can be reached and held for a soak time in the range of from about 5 hours to about 50 hours, more preferably between about 10 hours to about 40 hours. In still another aspect, the soak time may be in the range of from about 15 hours to about 30 hours. A preferred firing schedule includes firing at a soak temperature of between about 1415° C. and 1435° C. for between about 10 hours to about 35 hours.

As briefly stated above, and as further exemplified in the appended examples, the use of the potato starch as a pore former in the plasticized ceramic precursor batch composition of the present invention can enable the use of processing conditions that ultimately may provide a resulting ceramic honeycomb article having a unique combination of microstructure characteristics and performance properties. For example, in one aspect, the use of potato starch enables a reduction in the required overall firing cycle time by minimizing or eliminating the firing cycle hold periods typically used for conventional pore-former burnout (See FIG. 5). For example, a single firing rate may be employed in the first firing portion 120, for example, having an average rate of between about 20 and about 70° C./hour between room temp and about 1300° C. Furthermore, the firing cycle suitable for firing the ceramic precursor batch composition of the present invention may comprise a relatively slower ramp rate within an upper portion 130 at higher temperatures within the firing cycle. By utilizing the slower ramp rate in upper portion 130 above about 1300° C., a lower CTE may be obtained, while still obtaining acceptable microstructure characteristics imparting low backpressure in use of the end article and good filtration efficiency and strength.

Figure 5:
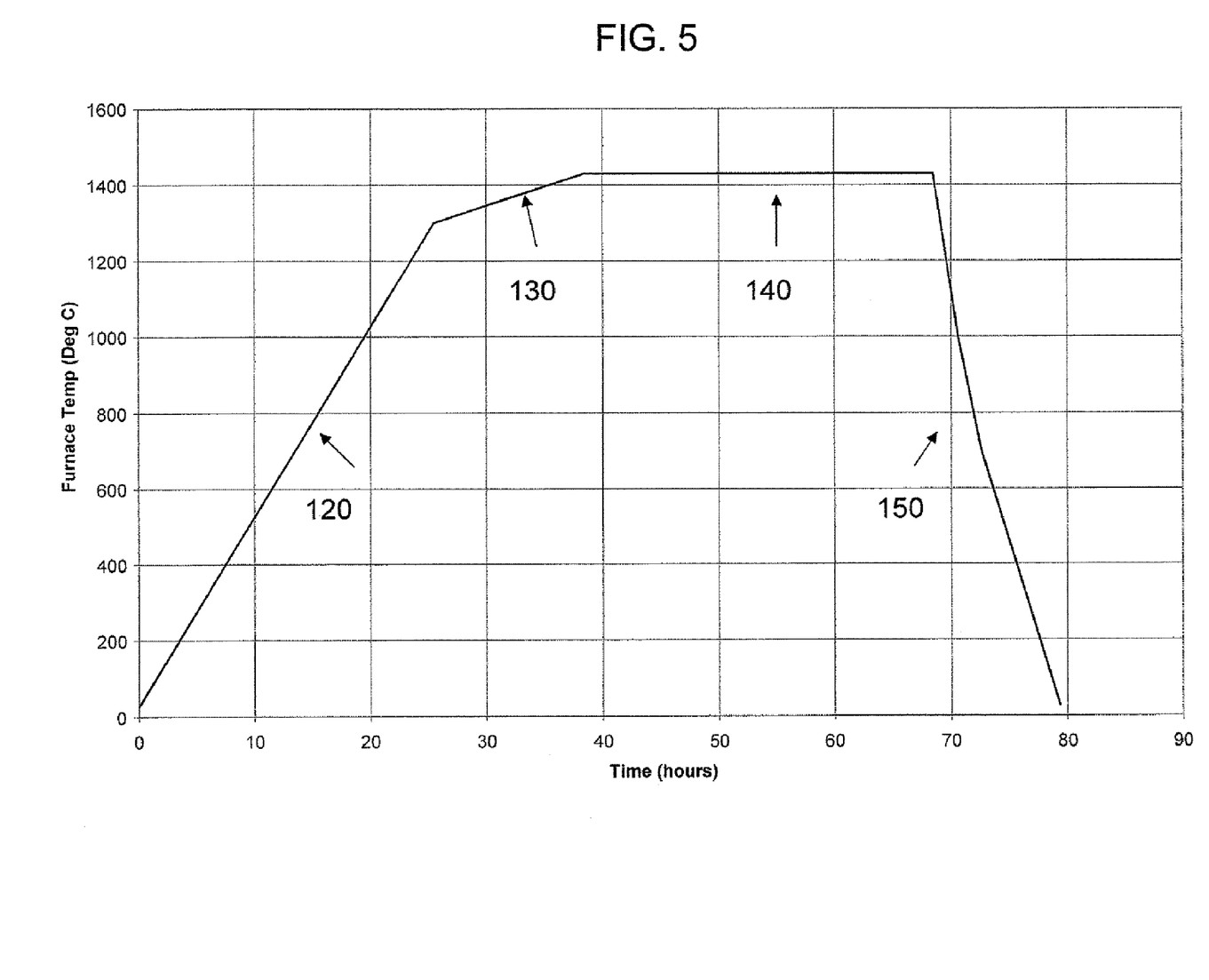
FIG. 5 is a graph illustrating an exemplary firing schedule for the ceramic honeycomb article according to the present invention.

For example, in one aspect, the maximum soak temperature, T(max), within soak portion 140 of a given firing cycle can be achieved by increasing the firing temperature above about 1300° C. at an average ramp rate between about 1300° C. and T(max) of less than or equal to 60° C./hour; or even less than or equal to 50° C./hour. In still another aspect, the soak temperature of a given firing cycle can be achieved by increasing the firing temperature above 1300° C. (in portion 130) at an average ramp rate less than or equal to 40° C./hour, less than or equal to 35° C./hour, less than or equal to 30° C./hour, or even less than or equal to 25° C./hour.

EXAMPLES

To further illustrate the principles of the present invention, the following examples are put forth so as to provide those of ordinary skill in the art with a complete disclosure and description of how the ceramic articles and methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations may have occurred. Unless indicated otherwise, parts are parts by weight, temperature is ° C. or is at ambient temperature, and pressure is at or near atmospheric.

A series of inventive and comparative cordierite honeycomb articles were prepared using various combinations of starting raw materials, including, powdered talc, kaolin, alumina-forming sources, silica-forming sources, binder, pore former, liquid vehicle, and lubricant and/or surfactant. The specific inventive (Inv.) and comparative (Comp.) powder batch compositions used to prepare the inventive and comparative cordierite honeycomb articles are set forth in Table 1 below. Properties for the comparative (Comp.) examples are provided in Table 2 below.

cell walls having a thickness of between about 0.015 and 0.018 inch, thereby producing a-300/15 or 200/18 cell geometry (see Tables). The wet or green honeycomb wares are then

TABLE 1

Batch Compositions (Wt. %)

|  | Inv. | Inv. | Inv. | Comp. | Comp. | Comp. | Comp. | Comp. |
|---|---|---|---|---|---|---|---|---|
| Composition | A | B | C | D | E | F | G | H |
| Talc | 40.7 | 40.7 | 40.7 | 39.8 | 39.8 | 40.7 | 40.7 | 40.7 |
| Talc Median Particle Size (μm) | 22.7 | 22.7 | 22.7 | 23.2 | 23.2 | 23.2 | 23.2 | 23.2 |
| Kaolin Clay | 16.0 | 16.0 | 16.0 | 0.0 | 0.0 | 16.0 | 16.0 | 16.0 |
| Kaolin Median Particle Size (μm) | 3.2 | 3.2 | 3.2 | na | na | 2.9 | 2.9 | 2.9 |
| Silica Source (Quartz) | 12.5 | 12.5 | 12.5 | 22.0 | 22.0 | 12.5 | 12.5 | 12.5 |
| Silica Median Particle Size (μm) | 24.8 | 24.8 | 24.8 | 24.8 | 24.8 | 24.8 | 24.8 | 24.8 |
| Alumina | 14.8 | 14.8 | 14.8 | 20.5 | 20.5 | 14.8 | 14.8 | 14.8 |
| Alumina Median Particle Size (μm) | 6.5 | 6.5 | 6.5 | 6.2 | 6.2 | 6.2 | 6.2 | 3.5 |
| Aluminum Trihydrate | 16.0 | 16.0 | 16.0 | 17.7 | 17.7 | 16.0 | 16.0 | 16.0 |
| Aluminum Trihydrate Median Particle Size (μm) | 15.0 | 15.0 | 15.0 | 11.5 | 4.6 | 4.6 | 21.0 | 4.6 |
| Potato Starch | 10.0 | 7.5 | 12.5 | 0.0 | 0.0 | 0.0 | 0.0 | 0.0 |
| Graphite | 0.0 | 0.0 | 0.0 | 0.0 | 0.0 | 0.0 | 0.0 | 20.0 |
| Binder (Methocel) | 4.0 | 4.0 | 4.0 | 5.0 | 5.0 | 4.0 | 4.0 | 4.0 |
| Lubricant | 1.0 | 1.0 | 1.0 | 6.6 | 6.6 | 1.0 | 1.0 | 1.0 |

Table 2 below illustrates that prior art comparative articles do not contain the desirable combinations of properties achieved by the present invention. Namely, the prior art articles do not achieve both a small amount of small pores (less than 15% below 10 μm), a small amount of large pores (less than 20% above 30 μm) and relatively lower porosity (less than 56%) while also retaining relatively low CTE.

TABLE 2

Comparative Example Properties

| | Comparative Example # | | | | |
|---|---|---|---|---|---|
| | 1 | 2 | 3 | 4 | 5 |
| Composition | D | E | F | G | H |
| Max Firing Temp. ° C. | 1425 | 1425 | 1425 | 1425 | 1405 |
| Soak Time (hrs) | 25 | 25 | 25 | 25 | 6 |
| Axial CTE ($10^{-7}$/° C.) | 5.8 | 6.9 | 6.0 | 5.1 | 3.8 |
| % P | 52.4 | 52.1 | 42.4 | 46.7 | 48.8 |
| $d_{10}$ | 9.5 | 13.4 | 10.7 | 8.4 | 4.0 |
| $d_{50}$ | 19.2 | 22.5 | 17.5 | 17.5 | 12.5 |
| $d_{90}$ | 41.5 | 48.2 | 37.1 | 37.6 | 32.7 |
| % < 10 μm | 12 | 5 | 8 | 14 | 33 |
| % > 30 μm | 18 | 23 | 13 | 13 | 12 |
| $d_{factor}$ | 0.51 | 0.40 | 0.39 | 0.52 | 0.68 |
| $d_{breadth}$ | 1.67 | 1.55 | 1.51 | 1.67 | 2.29 |

To manufacture the inventive articles, the dry batch compositions listed in Table 1 were charged to a Littleford mixer and then followed by the liquid vehicle addition. The pore former, binder and lubricant and/or surfactant are added as superadditions based upon wt. % of 100% of the inorganic materials. The liquid vehicle addition included between 20 and 32 wt. % of the liquid vehicle, such as water, as a superaddition based upon wt. % of 100% of the inorganic materials. After the liquid addition, the composition is mixed for approximately 3 minutes. The resulting mixture is then mulled in a large muller for approximately 5-20 minutes to provide a final plasticized ceramic batch mixture.

Each of the plasticized batches was then formed into a wet or green honeycomb articles, preferably by extrusion through an extrusion die and under conditions suitable to form honeycomb articles that were approximately 5.66 inches in diameter and included cell geometries of 200 or 300 cells/inch and dried immediately using a microwave or RF drier to preferably reach greater than approximately 90% drying. A conventional furnace is then used to remove any additional organics, to further dehydrate the raw materials, and to fire the green bodies and form the ceramic articles containing cordierite. The specific firing schedules employed are further described herein.

Inventive composition A, B and C were then fired to provide resulting inventive cordierite articles. An exemplary firing schedule is best shown in FIG. 5 illustrating the furnace temperature versus time (hours). The exemplary firing schedule includes a first ramp portion 120 between room temperature and about 1300° C., a second ramp portion 130 between about 1300° C. and the soak portion 140. The ramp rates of the portions 120, 130 and the temperatures and times for the soak 140 are as described above. The article is then rapidly cooled down in cooling portion 150.

The resulting articles were then evaluated to determine their relevant physical properties, such as for example, CTE, total porosity, median pore diameter, pore size distribution, elastic modulus, and modulus of rupture. CTE was measured by dilatometry in the axial direction (parallel to the cell channels). All measurements of pore microstructure were made by mercury porosimetry using a Autopore IV 9520 by Micrometrics. Elastic (Young's) modulus was measured on a cellular bar in the axial direction using a sonic resonance technique. Modulus of rupture (MOR) was measured on a rectangular cellular bar having 4×1×½ inch dimensions and in the axial direction by the four-point method. The test results are reported in Table 4-5 below.

An examination of the data set forth in Table 4-5 below indicates the ability for an inventive batch composition of the present invention to provide a resulting fired ceramic body having the unique combination of microstructure and performance properties described herein. Specifically, unique combinations of properties may be achieved. For example, suitable relatively lower porosities, narrow pore size distribution, and low CTE may be simultaneously achieved.

A study of inventive compositions comprising potato starch was conducted to illustrate the effects of differing amounts of potato starch pore former and alternative firing schedules would have on the resulting fired ceramic articles.

To this end, green bodies comprised of various inventive batch compositions were each fired under firing conditions 1-9 as set forth in Table 3 below. Specifically, the firing schedules reflect alternative combinations of maximum soak temperature, soak time, and average ramp rates. The variations in the resulting properties of axial CTE, Porosity (% P), $d_{50}$, $d_{10}$, $d_{90}$, %<10 μm, %>30 μm, $d_{factor}$, $d_{breadth}$ and the pore size distributions are set forth in Tables 4 and 5 below.

TABLE 3

Firing Time & Temperature Conditions

| Firing Conditions | 1 | 2 | 3 | 4 | 5 | 6 | 7 | 8 | 9 |
|---|---|---|---|---|---|---|---|---|---|
| T (max) ° C. | 1420 | 1420 | 1420 | 1420 | 1430 | 1430 | 1430 | 1430 | 1420 |
| Soak Time (hrs) | 30 | 30 | 15 | 15 | 30 | 30 | 15 | 15 | 15 |
| 1300-T (max) Rate (° C./hr) | 50 | 10 | 50 | 10 | 50 | 10 | 50 | 10 | 50 |
| 25-1300° C. Rate (° C./hr) | 50 | 50 | 50 | 50 | 50 | 50 | 50 | 50 | 15 |

TABLE 4

Inventive Example Properties

| | InventiveExample # | | | | | | | |
|---|---|---|---|---|---|---|---|---|
| | 1 | 2 | 3 | 4 | 5 | 6 | 7 | 8 |
| Composition | B | B | B | B | B | B | B | B |
| Firing Schedule | 1 | 2 | 3 | 4 | 5 | 6 | 7 | 8 |
| Axial CTE ($10^{-7}/°$ C.) | 5.3 | 4.7 | 6.2 | 3.4 | 4.6 | 0.5 | 6.1 | 3.3 |
| Cell Geometry | 300/15 | 300/15 | 300/15 | 300/15 | 300/15 | 300/15 | 300/15 | 300/15 |
| % P | 49.0 | 47.7 | 49.1 | 46.6 | 49.9 | 47.4 | 47.5 | 48.4 |
| $d_{factor} = (d_{50}-d_{10})/d_{50}$ | 0.39 | 0.44 | 0.42 | 0.44 | 0.33 | 0.43 | 0.32 | 0.40 |
| $d_{breadth} = (d_{90}-d_{10})/d_{50}$ | 1.35 | 1.28 | 1.29 | 1.28 | 1.26 | 1.33 | 1.19 | 1.25 |
| MOR (psi) | — | — | — | — | — | — | — | — |
| eMOD ($10^6$ psi) | — | — | — | — | — | — | — | — |
| Pore Size Distribution (μm) | | | | | | | | |
| Total Intrusion | 0.4022 | 0.3658 | 0.4023 | 0.3664 | 0.3855 | 0.3557 | 0.3729 | 0.3566 |
| $d_1$ (μm) | 6.3 | 4.7 | 6.1 | 4.6 | 5.6 | 3.0 | 8.4 | 4.8 |
| $d_2$ (μm) | 7.6 | 5.5 | 7.2 | 5.5 | 8.8 | 5.5 | 9.8 | 6.5 |
| $d_4$ (μm) | 9.1 | 6.4 | 8.5 | 6.6 | 10.5 | 7.1 | 11.0 | 8.1 |
| $d_{10}$ (μm) | 11.7 | 8.2 | 11.1 | 8.6 | 12.9 | 9.2 | 13.2 | 10.3 |
| $d_{25}$ (μm) | 15.2 | 11.2 | 15.1 | 11.4 | 16.0 | 12.3 | 16.2 | 13.3 |
| $d_{50}$ (μm) | 19.0 | 14.7 | 19.2 | 14.9 | 19.4 | 16.2 | 19.6 | 17.0 |
| $d_{75}$ (μm) | 23.9 | 18.8 | 24.0 | 19.2 | 24.4 | 20.6 | 24.4 | 21.5 |
| $d_{90}$ (μm) | 11.7 | 27.0 | 35.9 | 27.7 | 37.4 | 30.8 | 36.6 | 31.6 |
| Pore Size Distribution (%) | | | | | | | | |
| <10 μm | 5.8 | 18.0 | 7.1 | 17.4 | 3.1 | 12.9 | 2.2 | 9.1 |
| <15 μm | 24.1 | 52.5 | 24.7 | 50.8 | 19.2 | 42.4 | 18.2 | 35.9 |
| <20 μm | 57.2 | 79.3 | 55.5 | 78.1 | 54.3 | 72.8 | 53.5 | 68.6 |
| >30 μm | 14.3 | 8.4 | 14.1 | 8.8 | 14.7 | 10.4 | 14.6 | 11.2 |
| >50 μm | 6.8 | 4.4 | 6.1 | 4.1 | 6.9 | 5.3 | 6.2 | 5.4 |
| 10 μm ≦ % ≦ 30 μm | 79.9 | 73.6 | 78.8 | 73.8 | 82.2 | 76.7 | 83.2 | 79.7 |

TABLE 5

Inventive Example Properties

| | Example # | | | | | | | | | |
|---|---|---|---|---|---|---|---|---|---|---|
| | 9 | 10 | 11 | 12 | 13 | 14 | 15 | 16 | 17 | 18 |
| Composition | C | C | C | C | C | C | C | C | A | A |
| Firing Schedule | 1 | 2 | 3 | 4 | 5 | 6 | 7 | 8 | 9 | 9 |
| Axial CTE ($10^{-7}/°$ C.) | 5.7 | 4.2 | 6.3 | 4.1 | 4.6 | 3.4 | 6.1 | 3.7 | 3.8 | 2.5 |
| Cell Geometry | 300/15 | 300/15 | 300/15 | 300/15 | 300/15 | 300/15 | 300/15 | 300/15 | 200/18 | 300/15 |
| % P | 51.3 | 49.6 | 51.9 | 49.2 | 50.7 | 50.5 | 51.1 | 50.6 | 52.0 | 52.9 |
| $d_{factor} = (d_{50}-d_{10})/d_{50}$ | 0.38 | 0.44 | 0.37 | 0.38 | 0.36 | 0.41 | 0.34 | 0.40 | 0.42 | 0.43 |
| $d_{breadth} = (d_{90}-d_{10})/d_{50}$ | 1.24 | 1.25 | 1.20 | 1.03 | 1.18 | 1.21 | 1.20 | 1.18 | 1.32 | 1.24 |
| MOR (psi) | — | — | — | — | — | — | — | — | 422 | 424 |
| eMOD ($10^8$ psi) | — | — | — | — | — | — | — | — | 1.09 | 0.76 |
| Pore Size Distribution (μm) | | | | | | | | | | |
| Total Intrusion | 0.4507 | 0.4091 | 0.4460 | 0.3954 | 0.4317 | 0.3992 | 0.4344 | 0.3990 | 0.4300 | 0.4300 |
| $d_1$ (μm) | 7.2 | 5.1 | 6.7 | 6.9 | 5.0 | 2.4 | 6.7 | 5.1 | 4.0 | 4.0 |
| $d_2$ (μm) | 8.1 | 5.9 | 7.9 | 7.5 | 8.3 | 5.7 | 9.2 | 6.6 | 6.5 | 6.5 |

TABLE 5-continued

Inventive Example Properties

| | Example # | | | | | | | | | |
|---|---|---|---|---|---|---|---|---|---|---|
| | 9 | 10 | 11 | 12 | 13 | 14 | 15 | 16 | 17 | 18 |
| $d_4$ (μm) | 9.4 | 6.7 | 9.5 | 8.3 | 10.6 | 7.5 | 10.7 | 8.0 | 8.4 | 7.9 |
| $d_{10}$ (μm) | 12.0 | 8.9 | 12.1 | 10.0 | 13.1 | 9.9 | 13.1 | 10.1 | 11.2 | 11.1 |
| $d_{25}$ (μm) | 15.4 | 12.1 | 15.5 | 12.9 | 16.3 | 13.1 | 16.3 | 13.2 | 15.0 | 15.2 |
| $d_{50}$ (μm) | 19.2 | 15.7 | 19.3 | 16.2 | 20.4 | 16.6 | 19.7 | 16.9 | 19.3 | 19.5 |
| $d_{75}$ (μm) | 23.9 | 20.0 | 24.2 | 20.0 | 25.3 | 21.1 | 24.5 | 20.9 | 24.0 | 24.4 |
| $d_{90}$ (μm) | 35.9 | 28.6 | 35.3 | 26.7 | 37.2 | 30.0 | 36.7 | 30.0 | 36.8 | 35.4 |
| Pore Size Distribution (%) | | | | | | | | | | |
| <10 μm | 5.0 | 14.3 | 4.9 | 9.9 | 3.2 | 10.5 | 2.9 | 9.6 | 6.8 | 7.5 |
| <15 μm | 22.7 | 44.5 | 22.3 | 40.3 | 17.9 | 37.5 | 18.2 | 36.6 | 24.8 | 24.1 |
| <20 μm | 55.8 | 75.1 | 54.9 | 75.0 | 47.2 | 70.3 | 52.4 | 71.4 | 54.9 | 53.3 |
| >30 μm | 13.8 | 9.1 | 13.8 | 7.5 | 15.5 | 10.0 | 14.5 | 10.0 | 13.7 | 14.2 |
| >50 μm | 6.3 | 4.5 | 5.9 | 2.8 | 6.4 | 4.7 | 6.4 | 4.9 | 6.6 | 5.7 |
| 10 μm ≦ % ≦ 30 μm | 81.2 | 76.6 | 81.3 | 82.6 | 81.3 | 79.5 | 82.6 | 80.4 | 79.5 | 78.3 |

It should also be understood that while the present invention has been described in detail with respect to certain illustrative and specific aspects thereof, it should not be considered limited to such, as numerous modifications are possible without departing from the broad scope of the present invention as defined in the appended claims.

What is claimed is:

1. A ceramic honeycomb article, comprising:
   a porous ceramic containing cordierite having
      a total porosity (% P) wherein 42%<% P<56%, and
      a pore size distribution having less than 15% of the total porosity has a pore diameter less than 10 μm, less than 20% of the total porosity has a pore diameter greater than 30 μm, and $d_{breadth} \leq 1.50$
         wherein $d_{breadth} = (d_{90} - d_{10})/d_{50}$.

2. The ceramic honeycomb article of claim 1, further comprising % P<54%.

3. The ceramic honeycomb article of claim 1, further comprising % P<52%.

4. The ceramic honeycomb article of claim 3, further comprising 44%<% P<52%.

5. The ceramic honeycomb article of claim 1 wherein less than 10% of the total porosity has a pore diameter less than 10 μm.

6. The ceramic honeycomb article of claim 1 wherein less than 25% of the total porosity has a pore diameter greater than 25 μm.

7. The ceramic honeycomb article of claim 1 wherein greater than 60% of the total porosity has a pore diameter greater than or equal to 10 μm and less than or equal to 30 μm.

8. The ceramic honeycomb article of claim 7 wherein greater than 70% of the total porosity has a pore diameter greater than or equal to 10 μm and less than or equal to 30 μm.

9. The ceramic honeycomb article of claim 7 wherein greater than 80% of the total porosity has a pore diameter greater than or equal to 10 μm and less than or equal to 30 μm.

10. The ceramic honeycomb article of claim 1 wherein the total porosity comprises a median pore diameter ($d_{50}$) wherein 13 μm ≦ $d_{50}$ ≦ 22 μm.

11. The ceramic honeycomb article of claim 10 wherein 14 μm ≦ $d_{50}$ ≦ 21 μm.

12. The ceramic honeycomb article of claim 1, further comprising a coefficient of thermal expansion (CTE) wherein CTE ≦ 8.0×10$^{-7}$/° C. across the temperature range of from 25° C. to 800° C.

13. The ceramic honeycomb article of claim 12 wherein CTE ≦ 6.0×10$^{-7}$/° C. (25° C. to 800° C.).

14. The ceramic honeycomb article of claim 12 wherein CTE ≦ 5.0×10$^{-7}$/° C. (25° C. to 800° C.).

15. The ceramic honeycomb article of claim 12 wherein CTE ≦ 4.0×10$^{-7}$/° C. (25° C. to 800° C.).

16. The ceramic honeycomb article of claim 12 wherein CTE ≦ 3.0×10$^{-7}$/° C. (25° C. to 800° C.).

17. The ceramic honeycomb article of claim 1 wherein the pore size distribution further comprises a $d_{factor} \leq 0.45$, wherein $d_{factor} = (d_{50} - d_{10})/d_{50}$.

18. The ceramic honeycomb article of claim 17 wherein the $d_{factor} \leq 0.40$.

19. The ceramic honeycomb article of claim 17 wherein the $d_{factor} \leq 0.35$.

20. The ceramic honeycomb article of claim 17 wherein the $d_{factor} \leq 0.33$.

21. The ceramic honeycomb article of claim 1 wherein the pore size distribution further comprises a $d_{breadth} \leq 1.35$, wherein $d_{breadth} = (d_{90} - d_{10})/d_{50}$.

22. The ceramic honeycomb article of claim 21 wherein the $d_{breadth} \leq 1.20$.

23. The ceramic honeycomb article of claim 21 wherein the $d_{breadth} \leq 1.10$.

24. The ceramic honeycomb article of claim 1, further comprising:
   44%<% P<52%,
   14 μm ≦ $d_{50}$ ≦ 21 μm,
   CTE ≦ 6.0×10$^{-7}$/° C. (25° C. to 800° C.), and
   $d_{factor} \leq 0.45$, wherein $d_{factor} = (d_{50} - d_{10})/d_{50}$.

25. The ceramic honeycomb article of claim 1, further comprising:
   42%<% P<56%,
   13 μm ≦ $d_{50}$ ≦ 22 μm,
   CTE ≦ 6.0×10$^{-7}$/° C. (25° C. to 800° C.), and
   $d_{breadth} \leq 1.35$.

26. The ceramic honeycomb article of claim 1, further comprising:
   $d_{factor} \leq 0.45$, wherein $d_{factor} = (d_{50} - d_{10})/d_{50}$, and
   $d_{breadth} \leq 1.35$.

27. A method of manufacturing a ceramic honeycomb article, comprising the steps of:
   providing a plasticized cordierite precursor batch composition containing:

inorganic batch components selected from a magnesium oxide source; an alumina-forming source; and a silica-forming source;

a pore former having a median particle diameter greater than 40 μm;

a liquid vehicle; and a binder;

forming a honeycomb green body from the plasticized cordierite precursor batch composition; and firing the honeycomb green body under conditions effective to convert the honeycomb green body into the ceramic honeycomb article containing cordierite and having a total porosity greater than 42% and less than 56% and a pore size distribution wherein less than 15% of the total porosity has a pore diameter less than 10 μm, and less than 20% of the total porosity has a pore diameter greater than 30 μm.

28. The method of claim 27 wherein the pore former comprises a potato starch.

29. The method of claim 27 wherein the pore former is present in an amount of from 5 wt. % to 20 wt. % relative to the total weight of the inorganic batch components.

30. The method of claim 27 wherein the pore former comprises a potato starch having a median particle diameter in the range of from 45 μm to 55 μm.

31. The method of claim 27 wherein the inorganic batch components are selected to provide a sintered phase cordierite composition, as characterized on a oxide weight basis, consisting essentially of:

about 49 to about 53 percent by weight $SiO_2$, about 33 to about 38 percent by weight $Al_2O_3$, and about 12 to about 16 percent by weight MgO.

32. The method of claim 27 wherein the effective firing conditions comprise firing the honeycomb green body at a maximum soak temperature in range of from 1350° C. to 1450° C. and subsequently holding the maximum soak temperature for a period of time sufficient to convert the honeycomb green body into ceramic honeycomb article containing cordierite.

33. The method of claim 32 wherein the maximum soak temperature is in the range of from approximately 1415° C. to approximately 1435° C.

34. The method of claim 32 wherein the maximum soak temperature is achieved by increasing the temperature above about 1300° C. to the maximum soak temperature at an average ramp rate less than or equal to 60° C./hour.

35. The method of claim 32 wherein the maximum soak temperature is achieved by increasing the temperature to about 1300° C. at an average ramp rate between 10° C./hour and 70° C./hour.

* * * * *